Figure 1:
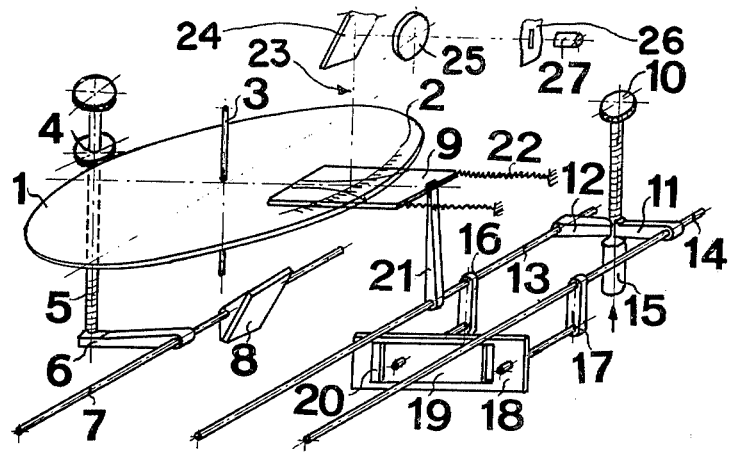

United States Patent [19]

Jasny

[11] 4,029,417

[45] June 14, 1977

[54] READING DEVICE FOR A MONOCHROMATOR

[75] Inventor: Jan Jasny, Warsaw, Poland

[73] Assignee: Polska Akademia Nauk, Instytut Chemii Fizycznej, Warsaw, Poland

[22] Filed: Oct. 7, 1975

[21] Appl. No.: 620,497

[30] Foreign Application Priority Data

Oct. 8, 1974 Poland .............................. 174673

[52] U.S. Cl. ............................ 356/100; 350/271
[51] Int. Cl.² ............................................. G01J 3/02
[58] Field of Search .......................... 356/100, 101

[56] References Cited

UNITED STATES PATENTS

| | | | |
|---|---|---|---|
| 2,669,899 | 2/1954 | Macleish | 356/100 |
| 3,610,758 | 10/1971 | Lu | 356/100 |

*Primary Examiner*—F. L. Evans

[57] ABSTRACT

A reading device for a monochromator having an outlet slit of adjustable width and a light dispersing element which is adjustable in relation to the outlet slit to shift the spectrum in relation to the outlet slit, the reading device comprising a scale which is displaceable in relation to the adjustment of the light dispersing element with respect to the outlet slit and a transparent plate slidably mounted above the scale for movement in a direction perpendicular thereto. A sliding mechanism for adjusting the width of the outlet slit is connected to the plate through a suitable linkage such that the plate follows the movement of the adjustment of the width of the outlet slit. A system of pairs of curved lines are formed on the plate and the lines have curvatures such that at a determined position of the light dispersion element and a determined width of the slit they intersect the scale at points characterizing a monochromator spectrum transmittance curve. A light dividing element is disposed above the plate to receive an image thereof and to pass the same successively through a lens and a mask to a photo-detector.

4 Claims, 4 Drawing Figures

READING DEVICE FOR A MONOCHROMATOR

The present invention relates to a reading device for a monochromator which significantly improves its utility.

Monochromators are known which are provided with a scale graduated in wave lengths $\lambda$ and/or wave numbers $\bar{\nu}$. The scale is equipped with a rotary or shifting mechanism which is coupled with an element effecting displacement of the light spectrum with regard to the outlet slit of the monochromator.

An appropriate indicator enables readings on a scale of the values of $\lambda$ and/or $\bar{\nu}$ for the light wave transmitted through the monochromator. The value of the readings provides the upper point of the monochromator light transmittance curve at its maximum. Other points of this curve necessary for its representation are determined by means of appropriate tables or by time — consuming calculations.

In these known monochromators the displacement of the spectrum occurs non-linearly in relation both two increments of wave length and wave number. Therefore, to make linear evolution of the spectrum possible in the device registering the spectrum devices are used in the known monchromators which are provided with cams of an accurately machined profile. The application of leverages by cam mechanisms complicates the construction of the monochromator. Futhermore, during the operation of the monochromator the cam surfaces become worn-out from which inaccurate instrument readings result.

An object of the invention is to provide a device for taking readings of wave lengths and/or wave numbers which will enable readings of a multitude of points on the monochromator transmittance curve at any position of the dispersion element and at any width of the slit. At the same time, the invention comtemplates an electronic reader of the monochromator scale which will enable, without any cam mechanisms, linear evolution of the registered spectrum in relation to the wave lengths or to the wave numbers even when the monochromator evolves the spectrum in relation to a different curve, e.g. dispersion curve.

These objects are met by providing the monochromator with a reading device whose essential element is a transparent plate placed above the known scale. The plate is mounted so that it can be moved in a direction perpendicular to the direction of shift of the said scale and the shifting mechanism is coupled with the mechansim for width adjustment of the slit. The plate is provided with a set of pairs of lines whose curvature is selected in such a way that at a determined position of the monochromator dispersion element and at a determined width of the slit, lines intersect the base of the known scale at points indicative of wave length or wave number which characterize the actual spectrum transmittance of the monochromator and, therefore, enable the determination of the transmittance curve. A light-dividing plate is located above the rotary or slidable monochromator scale, which directs a part of the light transmitted through or reflected from the scale to the observer's eye and part of it to the lens. Adjacent the lens is a mask and behind it a photodetector connected to a known electronic device. The lens produces an image of the scale in the plane of the mask. The dimensions of the mask aperture are selected so that they include the total width and a portion of the height of the image of a particular scale graduation. The light-dividing plate together with the lens, mask and photodetector is mounted slidably in a direction perpendicular to the direction of the scale shift. This enables variations in the position of the set of reading elements owing to which the mask aperture successively transmits all the scale marks or the scale marks $\lambda$ or $\bar{\nu}$ only.

Figure 2:
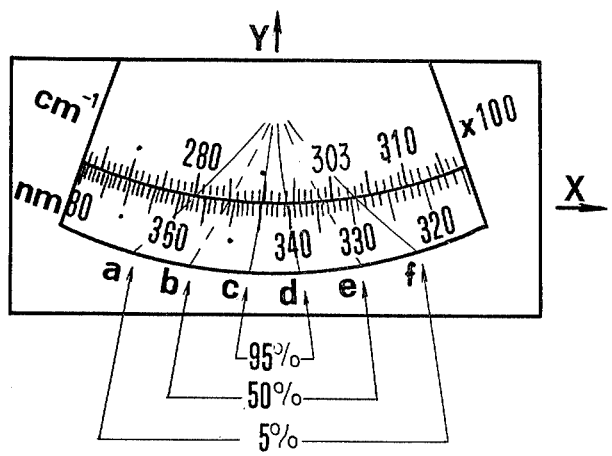
Figures 3, 4:
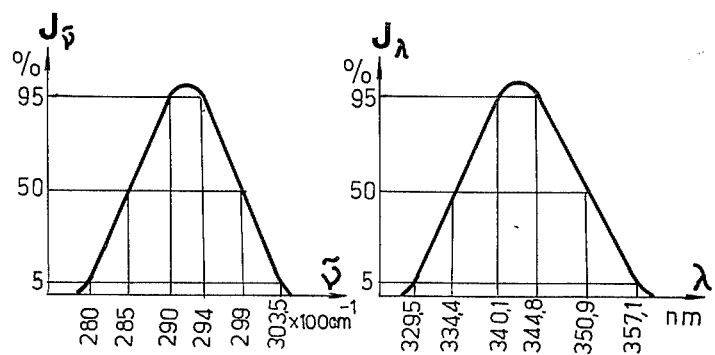

The objects of this invention are described more precisely by an embodiment of the invention taken with reference a the attached drawing in which FIG. 1 schematically illustrate the device of the invention in axonometric view, FIG. 2 is a top plan view of a transparent plate on a background of a portion of the monochromator scale with an adjustment for $\bar{\nu}$ max = 29.200 cm$^{-1}$ at a slit width $s = 1.5$ mm, FIG. 3 is a graph of the transmittance curve for the adjustment shown in FIG. 2 in relation to the wave number $\bar{\nu}$, and FIG. 4 is a graph of the same transmittance curve in relation to the wave length $\lambda$.

As shown in a drawing, the disc 1 with a scale 2 is mounted on a shaft 3 and is provided with a driving mechanism 4 for its rotary movement. A bolt 5 of the mechanism 4 brings about, through intermediary of lever 6 and shaft 7, variations in the inclination of a dispersion element 8, synchronized with the rotation of scale 2.

Above the scale 2 is located a slidable transparent plate 9 with etched lines which will be described in detail later. Close to the disc 1 there is a mechanism for effecting sliding movement of plate 9 and slit width adjustment, the mechanism being provided with a screw 10 and associated handle (not shown). The screw 10 is in contact with the ends of levers 11, 12 fixed on shafts 13, 14 respectively. Under the ends of levers 11, 12 is a play compensation mechanism 15. Levers 16, 17 are also mounted on shafts 13, 14 and connected by pivots to a frame 18 and leaf 19 which determine the width of slit 20. A lever 21 which remains in contact with the plate 9 is fixed on the shaft 13. The plate 9 is constantly pressed against lever 21 by spring 22.

Between is a plate 9 and the observer's eye the light-dividing plate 24 lens 25. Behind the and an adjacent lens there is a the mask 26 and photodetector 27 connected to an electronic device, not shown in the drawing. The plate 24, lens 25, mask 26 and photodetector 27 are mounted as an assembly on a frame, (not shown) which can be shifted in a direction perpendicular to the scale 2. The lens 25 is so designed to produce an image of scale 2 in the plane of mask 26. A rectangular aperture in the mask 26 has dimensions corresponding to the total width and partial height of the image of a single scale mark 2.

The transparent plate 9 shown in FIG. 2 is provided on its surface with a system of six curved lines $a, b, c, d, e, f$. Whose curvatures are selected in such a way that at their points of intersection with the circular arc or with the scale 2 they determine six characteristic points of the monochromator transmittance curve for the actual position of dispersion element 8 and the actual width of slit 20. The scale 2 has a double graduation: in the upper part it is graduated in cm$^{-1}$ of wave number $\bar{\nu}$ and in the lower part in $\mu$m of wave length $\lambda$. After setting of the dispersion element and monochromator slits on the scale 2 graduation the values are read which correspond to the points of intersection of lines $a, b, c,$ $d, e, f$ with this scale. The values read on the upper scale enable the determination of six points of the monochromator transmittance curve in relation to the wave number. The intersection points of the scale with lines a and f indicate the value of wave numbers for transmittance equal to 5% of the total energy of radiation, lines $b$ and $e$ for 50% thereof, and lines $c$ and $d$ for 95% thereof. The curve shown in FIG. 3 takes into account values assumed in the described example. The values of the intersection points read on the lower scale determine six points of the transmittance curve in relation the wave length. This curve is shown in FIG. 4 of the drawing.

In the case of uniform rotation of the dispersion element 8 and the disc 1 coupled with it, the photodetector 27 registers light pulses caused by momentary darkening of the mask 26 resulting from images of the graduation of scale 2 passing through its aperture and converts them into electric pulses serving for control of known stepwise drives in registering devices.

I claim:

1. A reading device for a monochromator having an outlet slit of adjustable width and a light dispersing element adjustable with respect to the outlet slit to shift the spectrum in relation to the outlet slit, said reading device comprising a scale, means for displacing said scale in relation to adjustment of the light dispersing element with respect to the outlet slit, a transparent plate slidably mounted above the scale for movement in a direction perpendicular to said scale, a sliding mechanism for adjusting the width of the outlet slit, means connecting said plate to said sliding mechanism for corresponding movement therewith, a system of pairs of curved lines on said plate having curvatures such that the lines, at a determined position of the light dispersion element and a determined width of said slit intersect the scale at points characterizing a monochromator spectrum transmittance curve, a light-dividing element disposed above said plate to receive an image thereof, a lens adjacent the light-dividing plate to transmit said image, a mask with an aperture adjacent said lens and a photodetector adjacent said mask for receiving the image transmitted therethrough.

2. A device as claimed in claim 1 wherein said pairs of lines at each position of said plate intersect graduations on said scale at points which determine a definite percentage value of the monochromator spectrum transmittance.

3. A device as claimed in claim 1 wherein said light-dividing plate, said lens, said mask and said photodetector constitute an assembly mounted so that it can be displaced in a direction perpendicular to said scale.

4. A device as claimed in claim 1 wherein said lens produces an image of marks on said scale in the plane of said mask, said aperture in the mask having dimensions to include the total width and a portion of the height of each particular graduation mark of said scale.

* * * * *